United States Patent
Graves et al.

(10) Patent No.: US 8,849,360 B2
(45) Date of Patent: Sep. 30, 2014

(54) SYSTEMS AND METHODS FOR COMMUNICATING WITH WIRELESS-ENABLED DEVICES THAT ARE CAPABLE OF RESPONDING TO CHANGES IN OPERATIONAL STATE

(75) Inventors: Alan F. Graves, Kanata (CA); Raymond Bruce Wallace, Ashton (CA); Guy Michael Amyon Farquharson Duxbury, Nepean (CA)

(73) Assignee: Avaya Inc., Basking Ridge, NJ (US)

( * ) Notice: Subject to any disclaimer, the term of this patent is extended or adjusted under 35 U.S.C. 154(b) by 2021 days.

(21) Appl. No.: 11/613,560

(22) Filed: Dec. 20, 2006

(65) Prior Publication Data
US 2008/0089255 A1  Apr. 17, 2008

Related U.S. Application Data

(60) Provisional application No. 60/829,032, filed on Oct. 11, 2006.

(51) Int. Cl.
| | |
|---|---|
| *H04M 1/00* | (2006.01) |
| *H04W 8/22* | (2009.01) |
| *H04B 1/16* | (2006.01) |
| *B60Q 1/00* | (2006.01) |
| *H04W 52/02* | (2009.01) |

(52) U.S. Cl.
CPC ............ *H04W 8/22* (2013.01); *H04W 52/0277* (2013.01); *H04W 52/0296* (2013.01)
USPC ........ 455/574; 455/572; 455/573; 455/343.1; 340/455

(58) Field of Classification Search
USPC ......... 455/456.1–6, 13.4, 522, 571, 572, 574, 455/127.1, 127.5, 343.5
See application file for complete search history.

(56) References Cited

U.S. PATENT DOCUMENTS

| 6,072,784 | A | * | 6/2000 | Agrawal et al. ............... 370/311 |
|---|---|---|---|---|
| 7,349,705 | B1 | * | 3/2008 | Holland ....................... 455/456.1 |
| 2002/0165828 | A1 | * | 11/2002 | Sakamoto ........................ 705/64 |
| 2003/0073447 | A1 | * | 4/2003 | Ogaki et al. .................. 455/456 |
| 2004/0127195 | A1 | * | 7/2004 | An ................................. 455/410 |
| 2004/0166878 | A1 | * | 8/2004 | Erskine et al. ............. 455/456.1 |
| 2004/0203895 | A1 | * | 10/2004 | Balasuriya ................. 455/456.1 |
| 2005/0009536 | A1 | * | 1/2005 | Ito et al. ..................... 455/456.1 |
| 2006/0205445 | A1 | * | 9/2006 | Sakaniwa et al. ............. 455/574 |

* cited by examiner

*Primary Examiner* — Kent Chang
*Assistant Examiner* — Chayce Bibbee

(57) ABSTRACT

A system for communicating with a wireless-enabled device. The system comprises an input for receiving from the device a signal indicative of the device being in a de-powered operational state; a functional entity configured to determine, on a basis of (i) knowledge that the device is in the de-powered operational state and (ii) context information regarding the device, a certain action to be taken by the device while in the de-powered operational state; and an output for causing transmission of a message to the device, wherein the message is for causing the device to take the certain action while in the de-powered operational state.

20 Claims, 5 Drawing Sheets

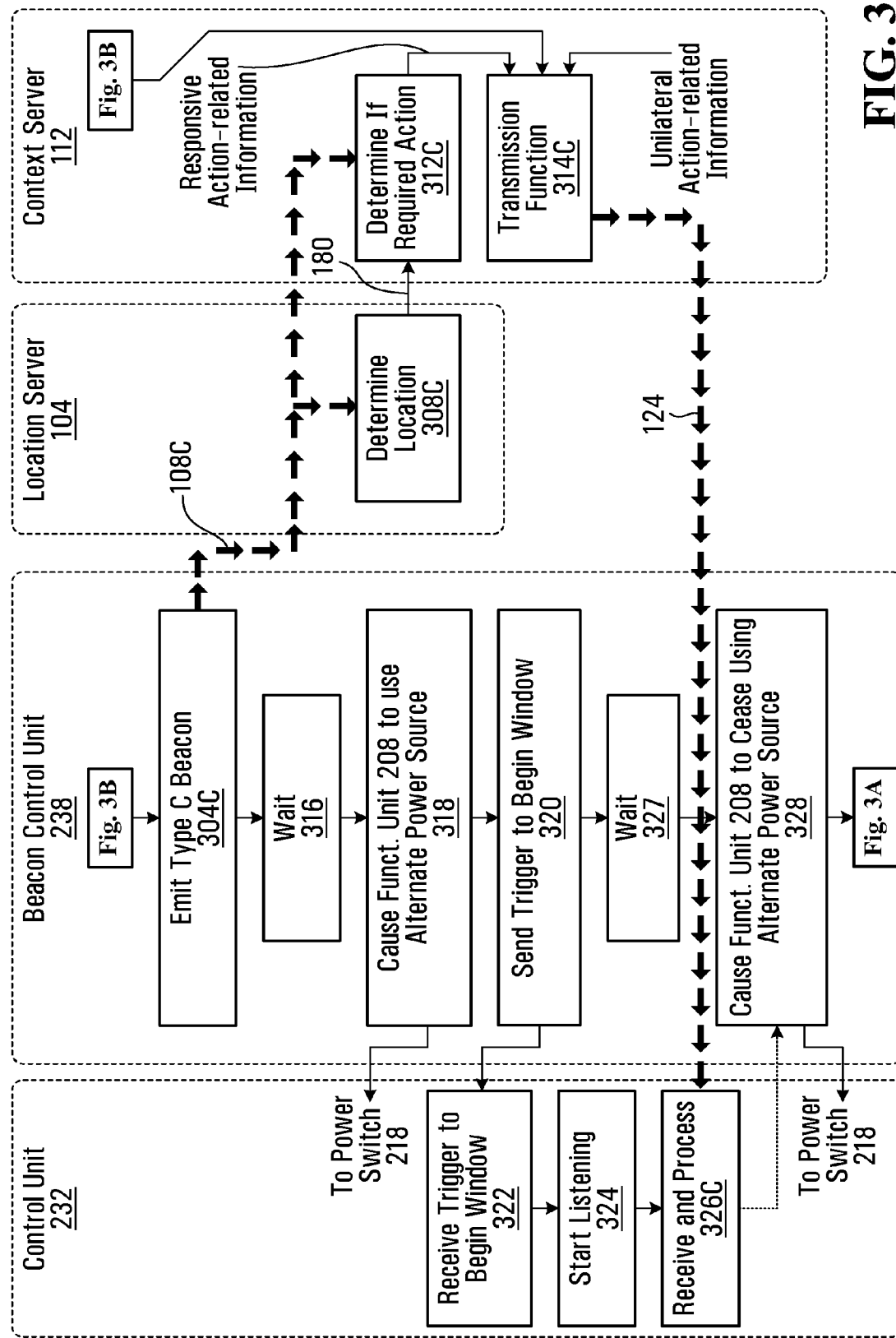

SYSTEMS AND METHODS FOR COMMUNICATING WITH WIRELESS-ENABLED DEVICES THAT ARE CAPABLE OF RESPONDING TO CHANGES IN OPERATIONAL STATE

CROSS-REFERENCE TO RELATED APPLICATIONS

The present application CLAIMS THE BENEFIT under 35 USC 119(e) of prior U.S. provisional patent application Ser. No. 60/829,032 to Graves et al., filed on Oct. 11, 2006, hereby incorporated by reference herein.

The present application is related in subject matter to a United States patent application by the Applicants, filed on the same date as the present application, entitled "WIRELESS-ENABLED DEVICE WITH CAPABILITY OF RESPONDING TO CHANGES IN OPERATIONAL STATE", hereby incorporated by reference herein.

FIELD OF THE INVENTION

The present invention pertains generally to wireless communications and, more specifically, to wireless-enabled devices that have an ability to respond to changes in operational state and to systems and methods for communicating with such devices.

BACKGROUND

In certain environments, such as the healthcare environment, there is a need to determine the location of, or communicate with, equipment that is powered down, yet the very act de-powering of the equipment (e.g., by turning off the device or depletion/removal of a battery) renders location of, and communication with, such equipment difficult, if not impossible. Hence there is a need for a device with an improved ability to communicate upon entering a de-powered operational state. There is also a need to develop systems and methods for communicating with such a device.

SUMMARY OF THE INVENTION

According to a first broad aspect, the present invention seeks to provide a system for communicating with a wireless-enabled device. The system comprises an input for receiving from the device a signal indicative of the device being in a de-powered operational state; a functional entity configured to determine, on a basis of (i) knowledge that the device is in the de-powered operational state and (ii) context information regarding the device, an action to be taken by the device while in the de-powered operational state; and an output for causing transmission of a message to the device, said message for causing the device to take said action while in the de-powered operational state.

According to a first broad aspect, the present invention seeks to provide a system for communicating with a wireless-enabled device. The system comprises an input for receiving location data from the device, the location data being emitted by the device in accordance with a signaling scheme; a location functional entity configured to determine a location of the device based on the location data; a context functional entity configured to determine, as a function of a trajectory of the device determined from at least two instances of the location of the device determined by the location functional entity, a modification to be made to the signaling scheme; and an output for sending a message to the device, said message for causing the device to effect said modification to the signaling scheme.

According to a first broad aspect, the present invention seeks to provide a system for communicating with a wireless-enabled device. The system comprises an input for receiving from said device an indication of a charge level of a main power source of said device; a functional entity configured to determine an action to be taken based on the indication of the charge level of the main power source of said device and based on a rate of change of said charge level; the functional entity being configured to cause said action to be taken.

According to a first broad aspect, the present invention seeks to provide a system for communicating with a wireless-enabled device. The system comprises an input for receiving from said device an indication of an attempt by a user to turn on said device; a functional entity configured to determine an action to be taken based on the indication of the attempt by the user to turn on said device; the functional entity being configured to cause said action to be taken.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 3A-3C collectively show a flow diagram depicting interaction of the components in the architecture of FIG. 1, including the wireless-enabled device of FIG. 2, in accordance with a non-limiting embodiment of the present invention.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
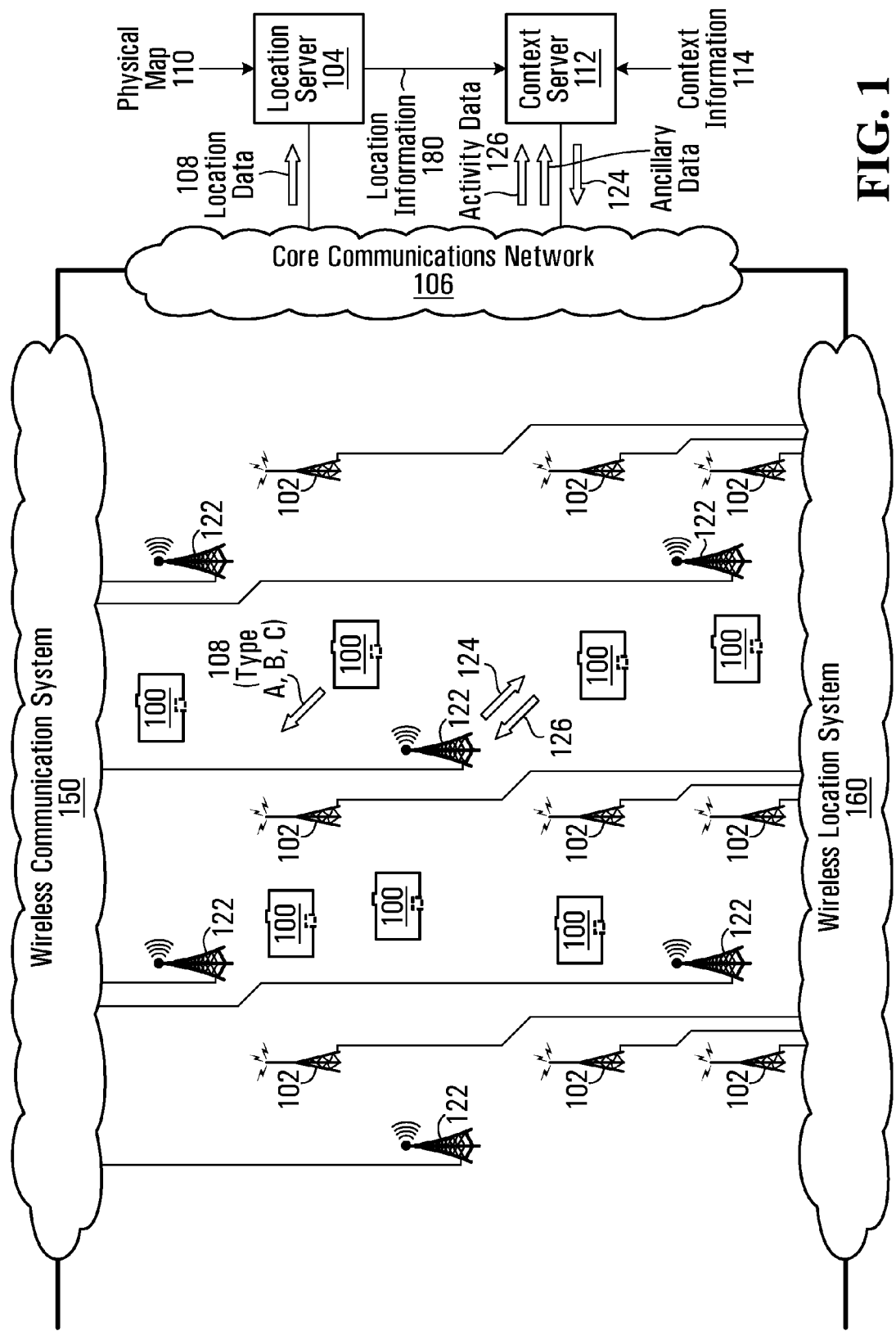
FIG. 1 shows an example architecture for detecting the location of, and communicating with, wireless-enabled devices.

Referring to FIG. 1, there is shown a location tracking and communications architecture for tracking the location of, and communication with, wireless-enabled devices 100 in an area of interest, in accordance with a first specific but non-limiting embodiment of the present invention.

A non-limiting example of a suitable area of interest is a healthcare establishment such as a hospital. Accordingly, examples of the wireless-enabled devices 100 include communications devices used by hospital staff, as well as electrical/electronic equipment such as electric wheelchairs, infusion pumps, etc. While the examples described herein refer to a healthcare environment, it should be understood that the present invention is applicable to other environments where it may be generally desirable to track the location of, and communicate with, wireless-enabled devices such as the wireless-enabled devices 100. Examples of such other environments include, without being limited to, schools, universities, laboratories, office workplaces, construction sites, etc.

Communication with Wireless-Enabled Devices 100

The architecture comprises a wireless communication system 150 and a wireless location system 160 both connected to a core communications network 106. The wireless location system 160 allows the location of the wireless-enabled devices 100 to be determined by a location server 104 connected to the core communications network 106. In accordance with certain non-limiting embodiments of the present invention, location determination is possible even when the wireless-enabled devices 100 are powered down (i.e., in a "de-powered" operational state). A context server 112, also connected to the core communications network 106, is configured to communicate with the wireless-enabled devices 100, even while in a de-powered operational state, in order to alter their functionality, such as to command a power-up, all the time without the de-powered devices drawing on main battery power, which may have been removed or depleted. How this can be accomplished is described later on in this specification.

A non-limiting example of the wireless communication system 150 is a wireless LAN (WLAN) wireless access point array including an array of wireless access points 122. Other configurations are of course possible without departing from the spirit of the present invention. In the present example, the wireless access points 122 are configured to exchange downstream and upstream messages 124, 126 with the wireless-enabled devices 100. As will be described in greater detail later on, the downstream messages 124 directed to a given one of the wireless-enabled devices 100 contain information that enable the functionality of the given one of the wireless-enabled devices 100 to be enabled, disabled or modified. For their part, the upstream messages 126 may comprise activity data destined for the context server 112. One example of activity data comprises data indicative of acknowledgements of receipt of the downstream messages 124, processing activity, memory usage, external sensor output, etc.

A non-limiting example of the wireless location system 160 is an ultra-wide-band (UWB) time-of-flight-based (also known as Time-Difference-Of-Arrival or TDOA) location system comprising an array of beacon receivers 102 distributed throughout the area of interest. Other configurations are of course possible without departing from the spirit of the present invention. In the present example, the beacon receivers 102 are configured to receive "beacons" 108 emitted by the wireless-enabled devices 100 either autonomously or in response to a paging signal. The beacons 108 may in a non-limiting example comprise bursts of radio-frequency (RF) energy or any other appropriate form of signal, including but not limited to RF messages, optical signals and acoustic (including ultrasonic) signals of various forms.

In order to facilitate location determination, a given one of the beacons 108 emitted by a given one of the wireless-enabled devices 100 may include location data destined for the location server 104. An example of location data is an identifier of the given one of the wireless-enabled devices 100. In some cases, the identifier may be in the form of a MAC address associated with the given one of the wireless-enabled devices, but this is not to be considered a limitation of the present invention. Another example of location data includes additional information that facilitates signal strength measurement or time-of-flight measurement by the beacon receivers 102. In an alternative embodiment, which is not described in detail but is considered to be within the scope of the invention, the location data may include a signal strength (or other) measurement performed at the given one of the wireless-enabled devices 100 itself.

In addition, a given one of the beacons 108 emitted by a given one of the wireless-enabled devices 100 may comprise ancillary data destined for the context server 112. One example of ancillary data comprises data indicative of an inattentiveness of the given one of the wireless-enabled devices 100 to downstream messages 124 sent from the wireless communication system 150, even if such messages are destined for the given one of the wireless-enabled devices 100. Another example of ancillary data comprises data indicative of a current or future attentiveness of the given one of the wireless-enabled devices 100 to downstream messages 124 sent from the wireless communication system 150 that are destined for the given one of the wireless-enabled devices 100. Yet another example of ancillary data comprises a charge level and/or a rate of change of the charge level of a power source in the given one of the wireless-enabled devices 100. Yet another example of ancillary data comprises an indication of the operational state of the given one of the wireless-enabled devices 100. A still further example of ancillary data comprises an output of a motion detection device such as a trembler switch or accelerometer.

The location data and the ancillary location data can be sent in various ways. In the simplest case, the two sets of data are sent together as separate digital words, separate packets, using different headers, using different encryption keys. In other cases, they can each change the signaling characteristics of the beacons 108 ways that are orthogonal to one another, such as by use of multiple modulation techniques (e.g., frequency hopping, pulse position modulation, envelope modulation, frequency division multiplexing, time division multiplexing, code division multiplexing, etc.). Still other techniques are possible and are within the scope of the present invention.

The beacons 108 are processed by the core communications network 106 upon receipt from the beacon receivers 102 (either with or without additional processing by the beacon receivers 102). A router (not shown) or other network (such as the location server 104 itself) entity can be used to process the received beacons 108 and the received upstream messages 126. As a result of this processing, the location data contained in the received beacons 108 is sent to the location server 104, while the ancillary data contained in the received beacons 108 and the activity data contained in the received upstream messages 126 is sent to the context server 112. The location server 104 and the context server 112 are described in greater later on in this specification.

It should further be understood that various implementations of the location detection system 160 are possible, and can have an impact on the design of the beacons 108. For example, the beacons 108 could denote precise location (as used in a UWB-based system) or approximate location (as used by WLAN-based systems such as Ekahau, Newbury and Aeroscout). Moreover, although the wireless access points 122 and the beacon receivers 102 are shown as forming distinct arrays of components to symbolize that different wireless technologies may be used for both functions, it should be appreciated that in alternative embodiments, common wireless technology may be used for the wireless access points 122 and the beacon receivers 102. A non-limiting example of such common technology is an 802.11 Wireless LAN with remote unit location by a fingerprinting method. In such cases, the wireless access points 122 would serve as the beacon receivers 102 (or vice versa), and the wireless communication system 150 would in fact be the same as the wireless location system 160. Also, under such circumstances, the beacons 108 would represent a special form of the upstream messages 126 (or vice versa), and the location data, ancillary data and activity data can be transmitted over the same medium.

It should also be appreciated that the wireless location system 160, while a useful adjunct, can be entirely dispensed with. In such cases, there is no use for a location server 104, and the beacons 108 emitted by the wireless-enabled devices 100 (which are combined with the upstream messages 126) comprise only ancillary data. Thus, it should be appreciated that only a subset of the functionality available with added reliance on the wireless location system 160 will be possible. Nevertheless, certain advantageous functions can be executed, particularly where a given one of the wireless-enabled devices 100 that is in a de-powered operational state is to be woken up for the purposes of a software upgrade, changing its functionality or effecting a routine maintenance check of their condition before returning it to sleep, etc.

For completeness, the remainder of this specification will assume that the architecture comprises the wireless location system 160 and the location server 104.

Location Server 104

The location server 104 is configured to determine the location of the various wireless-enabled devices 100 having emitted the beacons 108. This can be done using conventional methods, including but not limited to triangulation. Using triangulation, when three or more beacon receivers 102 indicate that they have received one of the beacons 108 pertaining to the same wireless-enabled device, it is possible to uniquely ascertain an area where that wireless-enabled device is located, relative to the distribution of the beacon receivers 102. Thus, the beacons 108 emitted by the wireless-enabled devices 100 enable the location server 104 to determine the location of the wireless-enabled devices 100 within the area of interest.

The location server 104 also receives a physical map 110 of the area of interest. The physical map 110 includes the known locations of the beacon receivers 102. Moreover, the physical map 110 may include a breakup of the area of interest into one or more zones having distinct broad functional characteristics, depending on the environment of the area of interest. For example, where the area of interest is a hospital, different zones of the physical map 110 may correspond to: "operating room", "corridor", "off duty area" (such as a kitchen, locker room, etc.), "inaccessible" (such as a washroom facility, changing room, elevator, etc.) and so on. Thus, using the physical map 110 as a frame of reference, and registering the layout of the beacon receivers 102 to their known locations within the physical map 110, the location server 104 can generate location information 180 regarding the various wireless-enabled devices 100, which includes their locations within the area of interest, as well as the zone(s) associated with their locations.

Context Server 112

Turning now to the context server 112, this network entity is also connected to the core communications network 106, and is in communication with the location server 104 (if used) either directly or via the communications network 106. The context server 112 receives the aforesaid location information 180 derived by the location server 104 from the location data in the received beacons 108. The context server 112 also receives the ancillary data derived from the received beacons 108. The context server 112 further receives the activity data derived from the received upstream messages 126. In addition, the context server 112 receives "context information" 114 impinging from various physical and non-physical environments. Examples of context information 114 include but are not limited to:

sensor outputs;
authorization levels;
facility routine/emergency status;
identification of specific equipment;
personnel activities and associations/proximity;
policies;
action plans;
inventory characteristics;
associations between wireless-enabled devices and authorized users;
authentication databases;
maintenance scheduling information;
per-zone authentication requirements;
per-zone access privileges;
per-zone authorized personnel associations;
the operational states of the wireless-enabled devices 100
etc.

On the basis of the location information 180, the ancillary data, the activity data and the context information 114, the context server 112 deduces what the situation is and what constitutes an appropriate response. One form of an appropriate response may involve sending commands to enable, disable or modify functionality of individual ones of the wireless-enabled devices 100. This is achieved by sending the aforesaid downstream messages 124 via the wireless access points 122 and the wireless communication system 150. Further detail regarding the operation of the context server 112 will be provided later on in this specification.

Wireless-Enabled Device 200

With detailed reference now to FIG. 2, there is shown a particular one of the wireless-enabled devices 100 (hereinafter denoted 200) suitable for use in the architecture of FIG. 1. Generally speaking, the wireless-enabled device 200 comprises a first functional unit 206 which implements the main functions presented to a user when in an active operational state, as well as a second functional unit 208 which communicates between the first functional unit 206 and the core communications network 106 via an antenna subsystem 204. A third functional unit 210 may be provided in the wireless-enabled device 200, which emit beacons conveying location data (thus allowing the wireless-enabled device 200 to be physically located by the location server 104) but also conveying ancillary data (thus allowing the context server 112 to take actions regarding communication with the wireless-enabled device 200).

The wireless-enabled device 200 is normally (i.e., when in an active operational state) powered from a main power unit 212, which adapts the output of a main power source such as battery (or battery pack) 250 to the power rails used in the wireless-enabled device 200. The main power source 250 may be removable or user changeable (e.g., as in a laptop or personal computer). In addition, an alternative power unit 214 containing a possibly smaller, possibly hidden, possibly non-removable, rechargeable, alternate power source 260 is irreversibly fed from the main power unit 212. The alternate power unit 214 is used to adapt the output of the alternative power source to provide power to low-power consumption functions within the third functional unit 210 and, under specific conditions to be described herein below, to provide intermittent power to the second functional unit 208 via a power switch 218.

A detailed structural description of the aforementioned components of the wireless-enabled device 200 is now provided, while their interaction under various circumstances will be described thereafter in the context of a beacon emission process.

Figure 2:
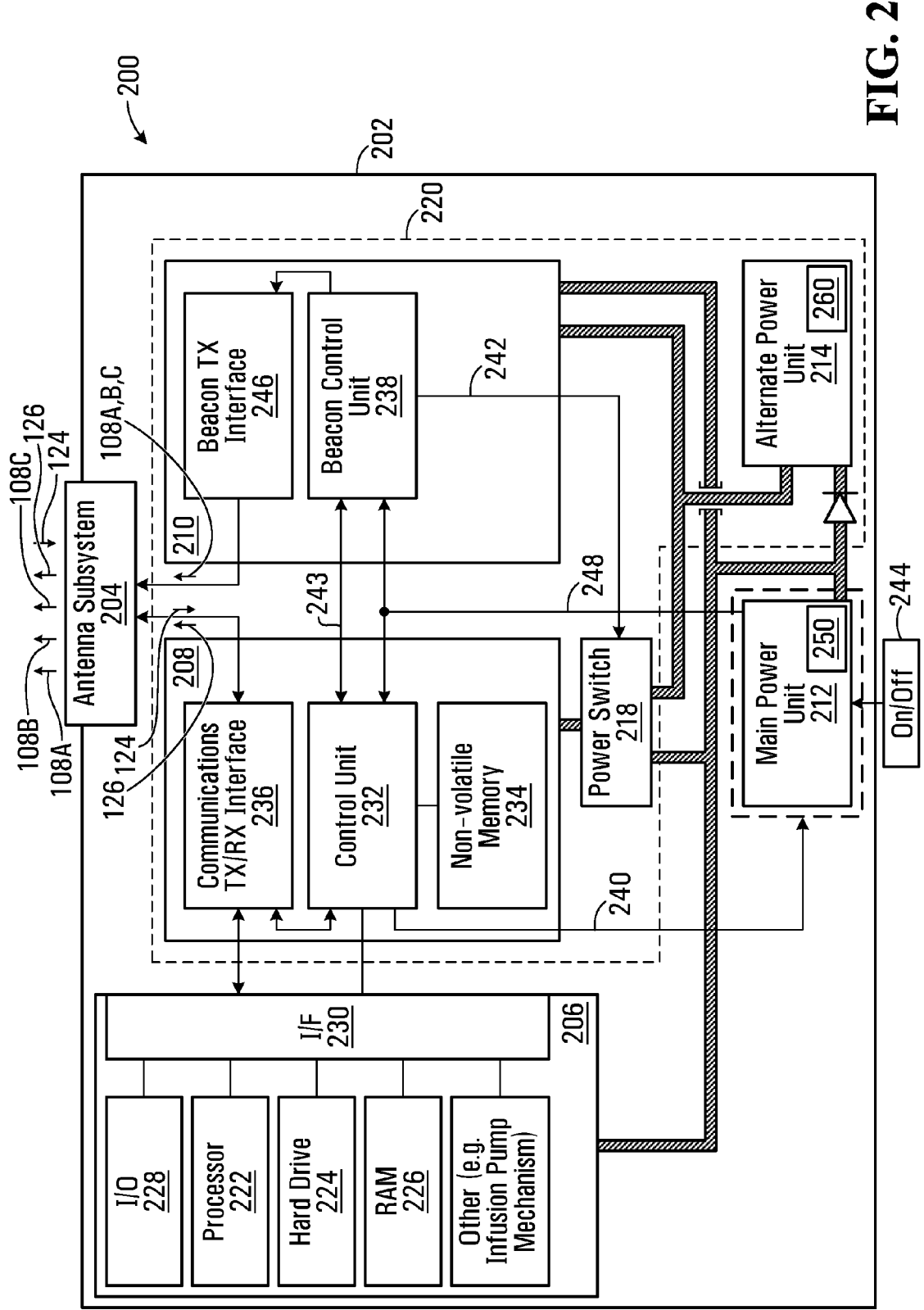
FIG. 2 shows a wireless-enabled device suitable for use in the architecture of FIG. 1, in accordance with a non-limiting embodiment of the present invention.

Specifically, with continued reference to FIG. 2, the wireless-enabled device 200 comprises a housing 202 in which there is provided the aforementioned main power unit 212, as well as the aforementioned antenna subsystem 204 connected to the aforementioned first functional unit 206 and a network interface module 220. The antenna subsystem 204 can be passive and consists of either a shared antenna structure or dedicated antenna structures for location (optional) and communication. For example, a shared antenna structure may be used for the case where both the wireless location system 160 and the wireless communication system 150 are WLAN-based, while dedicated antenna structures can be used in the case where the wireless location system 160 is UWB-based location and the wireless communication system 150 is WLAN-based.

The main power unit 212 represents a source of electrical power that may come from the aforementioned main power source 250 (such as a battery or battery pack). The main power source 250 can be either a primary power source or can be rechargeable by periodically connecting an external recharger which draws power from an outlet in a wall (not shown). The main power unit 212 is an interruptible source of power. For example:

the main power unit 212 may be interrupted by an on/off switch 244 that may be accessible from outside the housing 200. It is noted that the setting of the on/off switch 244 can be overridden by a control signal 240 received from the network interface module 220, thereby allowing power from the main power unit 212 to be selectively interruptible;

in the case where the main power source 250 is a battery, the housing 202 may be constructed to permit removal of the battery, such as in a tablet or laptop PC, which would also result in power from the main power unit 212 being interrupted;

in the case where the main power unit 212 is an outlet in a wall (not shown), the housing 202 may include an electrical cord (not shown) that can be unplugged from such outlet in order to interrupt the power from the main power unit 212.

At a given instant in time, the wireless-enabled device 200 is associated with an operational state that may be "active" or "de-powered". Specifically, in the "active" state, the on/off switch 244 is "on" and the main power unit 212 holds sufficient charge (e.g., above a certain threshold) and is being used to power the first functional unit 206 and the network interface module 220. In the "de-powered" state, power from the main power unit 212 is cut off to the first functional unit 206 and the network interface module 220. For instance, power from the main power unit 212 can be cut off by setting of the on/off switch 244 to "off" (despite the fact that the main power unit 212 may hold sufficient charge to support the wireless-enabled device 200 in an active operational state). Alternatively, power from the main power unit 212 can be cut off due to depletion or removal of the main power unit 212. As will be described in further detail later on, operation of certain components of the network interface module 220 will differ, depending on whether the wireless-enabled device 200 is in the active operational state or in the de-powered operational state.

The first functional unit 206 comprises standard operating features of the wireless-enabled device 200. For example, the first functional unit 206 may comprise a processor 222, non-volatile memory (e.g., a hard drive 224), volatile memory (e.g., RAM 226), various interfaces 228, 230 and possibly other application-specific entities (such as an infusion pump mechanism, by way of non-limiting example). The complexity of the first functional unit 206 will vary in accordance with the nature of the wireless-enabled device 200 and the environment in which it is employed.

The network interface module 220, which may be implemented as a network interface card, for example, comprises the aforementioned second functional unit 208, the aforementioned third functional unit 210, the aforementioned power switch 218 and the aforementioned alternate power unit 214.

The alternate power unit 214 converts the electrical power output from the alternate power source 260 in order to supply power when the wireless-enabled device 200 is in a de-powered state. The alternate power source 260 may be internal to the housing 202 and incapable of being removed without physically damaging the housing or using specialized service tools. If the alternate power source 260 is rechargeable, then when the main power source 250 is available and holds sufficient charge, it can be used to charge the alternate power source 260. This is represented in FIG. 2 by a diode symbol placed along the line between the main power unit 212 and the alternate power unit 214, where the diode symbol represents the fact that the alternate power unit 214 is not required to provide power to the main power unit 212 (or to the first functional unit 206, for that matter). In a non-limiting embodiment, the alternate power source 260 can be dimensioned to provide substantially less total energy (power×time) than the main power source 250 since it is only used to power a smaller portion of the wireless-enabled device 200, and even then such portion is only powered intermittently. However, persons skilled in the art will appreciate that the present invention does not impose any limit on the size or power capacity of the alternate power source 260.

The second functional unit 208 comprises a control unit 232 connected to a non-volatile memory 234 and to a communications transmit/receive interface 236. It should be understood that other components, such as a volatile memory, may be provided. The control unit 232 is connected to the first functional unit 206 via the interface 230. Additionally, the control unit 232 is connected to a beacon control unit 238 in the third functional unit 210. Furthermore, the control unit 232 is connected to a power source monitoring output 248 that carries a signal indicative of a charge level of the main power source 250 (which can be expressed as a numerical value or as one of a plurality of levels such "normal", "near depletion", "depleted"). The power source monitoring output 248 may further convey an indication of the presence or absence of the main power source 250 in the main power unit 212. The control unit 232 is also provided with the capability to know the setting of the on/off switch 244.

The communications transmit/receive interface 236 is connected between the interface 230 of the first functional unit 206 and the antenna subsystem 204. In the downstream direction of communication, the communications transmit/receive interface 236 receives downstream messages 124 from the communications network 106 via the wireless access points 122, and routes them either to the control unit 232 or to the first functional unit 206 via the interface 230, depending upon the operational state of the wireless-enabled device 200 and possibly other factors. In the upstream direction of communication, the communications transmit/receive interface 236 receives data destined for the context server 112 from the control unit 232 and the interface 230 of the first functional unit 230. This data, referred to previously as activity data, is formulated into the upstream messages 126 that are sent wirelessly from the wireless-enabled device 200, and received by the array of wireless access points 122.

Control Process Executed by Control Unit 232

The control unit 232 comprises suitable software, firmware, hardware and/or control logic for executing a control process. During execution of the control process, the control unit 232 may access the non-volatile memory 234. The control process is based on one or more of the following inputs:
- data received from the interface 230 of the first functional unit 206;
- certain ones of the downstream messages 124 received via the communications transmit/receive interface 236; and
- data received from the beacon control unit 238;
- the charge level of the main power source 250 and the operational state (i.e., active or de-powered) of the wireless-enabled device 200, as determined from the power source monitoring output 248 and knowledge of the setting of the on/off switch 244.

As a result of executing the control process, the control unit 232 generates one or more of the following outputs:
- data to be sent to the communications transmit/receive interface 236 for transmission to the context server 112 in the form of upstream messages 126;
- data destined for the first functional unit 206, either currently, or for future action;
- data destined for the beacon control unit 238;
- the control signal 240 for interrupting/restoring power from the main power unit 212.

The second functional unit 208 receives power via the power switch 218, which allows power to be drawn from either the main power unit 212 or the alternate power unit 214, based on a control signal 242. The control signal 242 is received from the third functional unit 210, which is now described.

Specifically, the third functional unit 210 comprises the aforementioned beacon control unit 238 connected to a beacon transmit interface 246. The third functional unit 210 is powered from the main power unit 212 when the main power source 250 is present and holds sufficient charge, and from the alternate power unit 214 otherwise.

The beacon transmit interface 246 receives data from the beacon control unit 238 and formulates this data into the aforesaid beacons 108 sent via the antenna subsystem 204. The beacon control unit 238 is also communicatively coupled to the control unit 232 of the second functional unit 208 via a link 243. In addition, the beacon control unit 238 is connected to the power source monitoring output 248 that carries a signal indicative of a charge level of the main power unit 212. The beacon control unit 238 is also provided with the capability to know the setting of the on/off switch 244.

The beacon control unit 238 comprises suitable software, firmware, hardware and/or control logic for executing a beacon emission process. A non-limiting example of the beacon emission process, as well as its interaction with the control process mentioned above as being executed by the control unit 232, is now described.

Beacon Emission Process Executed by Beacon Control Unit 238

Figure 3A:
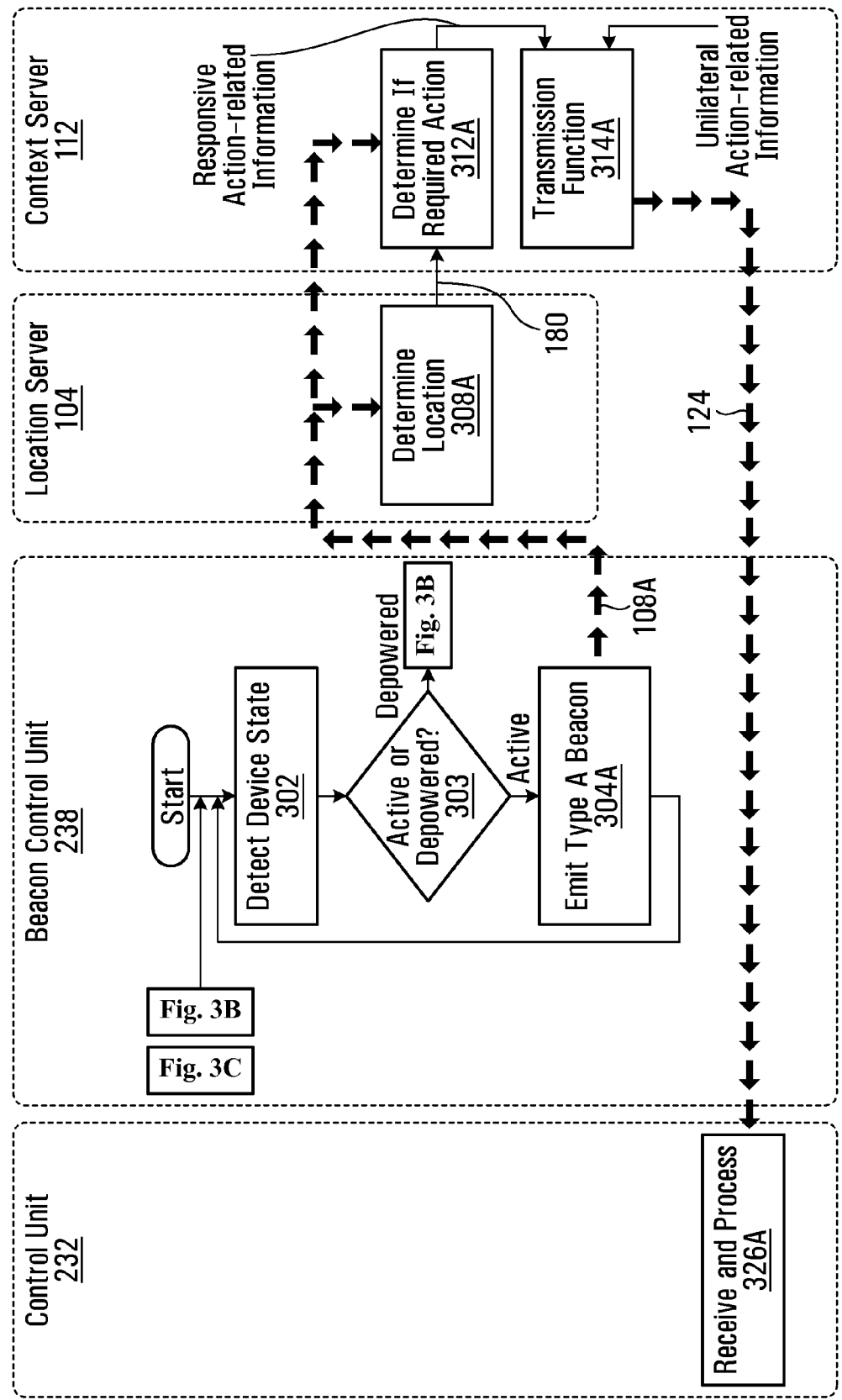
Figure 3B:
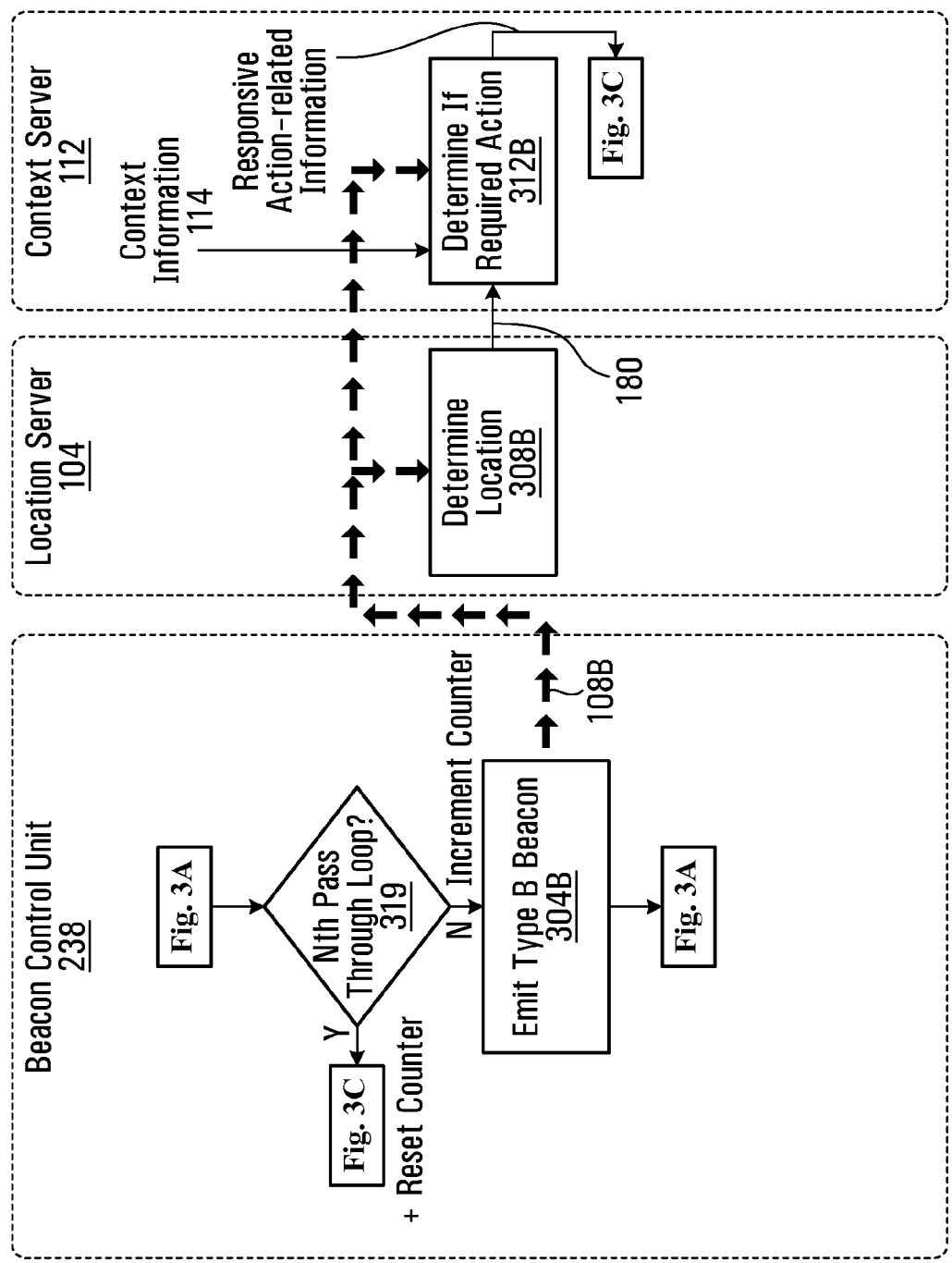

The beacon emission process executed by the beacon control unit 238 causes the emission of beacons 108 even when the wireless-enabled device 200 is in a de-powered operational state. The beacons 108 convey ancillary data, allowing the context server 112 to make decisions regarding communication with the wireless-enabled device 200. In some embodiments, the beacons 108 also convey location data, allowing the wireless-enabled device 200 to be located by the location server 104. With reference now to FIGS. 3A-3C, there is shown a flow diagram depicting interaction among (i) the beacon control unit 238 (during execution of the beacon emission process); (ii) the control unit 232; (iii) the location server 104; and (iv) the context server 112, in accordance with a specific non-limiting embodiment of the present invention.

Step 302 (FIG. 3A)

The beacon emission process can be regarded as a continuous loop that begins with the beacon control unit 238 determining the operational state of the wireless-enabled device 200 based on the power source monitoring output 248 (which is indicative of the charge level of the main power source 250) and knowledge of the setting of the on/off switch 244. It is recalled that in the active operational state, the on/off switch 244 is "on" and the main power unit 212 is available and is being used to power the first functional unit 206 and the network interface module 220. In the de-powered operational state, power from the main power unit 212 is cut off. This may occur due to setting of the on/off switch to "off", or due to depletion or removal of the main power unit 212. The next step is step 303.

Step 303 (FIG. 3A)

The beacon control unit 238 determines whether the operational state of the wireless-enabled device 200, as determined at step 302, is "active" or "de-powered". If the operational state of the wireless-enabled device 200 is de-powered, then the beacon control unit 238 proceeds to step 319 in FIG. 3B (see below). If the operational state of the wireless-enabled device 200 is active, then the beacon control unit 238 proceeds to step 304A.

Step 304A (FIG. 3A)

The beacon control unit 238 causes the emission of a beacon via the antenna subsystem 204. The beacon conveys ancillary data which is described as being of a certain "type" (in this case, Type A, Type B or Type C), depending on the operational state of the wireless-enabled device 200. In this case, where the wireless-enabled device 200 was found to be in the active operational state, the ancillary data is of Type A and the corresponding beacon emitted at step 304A is denoted 108A. The ancillary data can further include the charge level (and possibly also the rate of change of the charge level) of the main power source 250 in the main power unit 212, as determined from the power source monitoring output 248.

In addition, the beacon 108A emitted via the antenna subsystem 204 can optionally convey location data to allow the location server 104 to determine the location of the wireless-enabled device 200 within the area of interest. Non-limiting examples of location data include an identifier of the wireless-enabled device 200, a formatted version of a signal envelope for certain location systems (e.g., a UWB-based system) or other parameters used by a different location system (e.g., a WLAN-based system).

After emission of the beacon 108A, the beacon control unit 238 returns to step 302. Meanwhile, continuing to assume that the wireless location system 160 is employed, the beacon 108A is received by the beacon receivers 102 in the wireless location system 160. The beacon 108A is processed by the core communications network 106. As a result, the location data relating to the beacon 108A is relayed to the location server 104 while the ancillary relating to the beacon 108A data is relayed to the context server 112. Thus, the present description continues with step 306A.

Step 306A (FIG. 3A)

The location data relating to the beacon 108A is received at the location server 104. The location server 104 determines the location of the wireless-enabled device 200 based on the location data relating to the beacon 108A, and generates location information 180 regarding the wireless-enabled device 200, which includes the location of the wireless-enabled device 200 within the area of interest, as well as the zone(s) associated with such location. The next step is step 312A.

Step 312A (FIG. 3A)

The context server 112 receives the location information 180 from the location server 104 and the ancillary data relating to the beacon 108A from the core communication network 106. The context server 112 also receives the activity data conveyed by the upstream messages 126 received from the wireless-enabled device 200 in the meantime. The context server 112 considers this information together with the context information 114 (applying the various policies, etc.) and determines whether a "responsive action" is required. A responsive action is one which is triggered by the value of the ancillary data and/or the location information 180. Examples of responsive actions will be described in greater detail later on. Generally speaking, however, responsive actions are triggered by changes in charge level of the main power source 250, changes in the operational state of the wireless-enabled device and changes in the location of the wireless-enabled device. Some of the responsive actions may call for modification, enabling or disabling of functionality in the wireless-enabled device 200. In such cases, the context server 112 formulates "responsive action-related information" to be transmitted to the wireless-enabled device 200.

Step 314A (FIG. 3A)

Also based on the context information 114, the context server 112 may determine that certain "unilateral actions" are required. A unilateral action is one which does not depend on the ancillary data or the location information 180, but which may depend on the activity data. A unilateral action may also depend on other factors such as the current time. Examples of unilateral actions will be described in greater detail later on. Generally speaking, however, unilateral actions can be triggered by external events and/or application-level occurrences at the wireless-enabled device 200. Some of the unilateral actions may call for modification, enabling or disabling of functionality in the wireless-enabled device 200. In such cases, the context server 112 formulates "unilateral action-related information" to be transmitted to the wireless-enabled device 200.

The context server 112 causes execution of a transmission function that causes the responsive action-related information determined at step 312A and the unilateral action-related information, if any, to be sent to the wireless-enabled device 200. Transmission of the responsive action-related information and the unilateral action-related information is effected in the form of the downstream messages 124 destined for the wireless-enabled device 200. Because it is assumed that the wireless-enabled device 200 is in an active operational state (due to the receipt of ancillary data of Type A conveyed the beacon 108A), the downstream messages 124 are expected to be receivable by the wireless-enabled device 200. Under this assumption, the downstream messages 124 conveying the responsive action-related information and the unilateral action-related information are received at the communications transmit/receive interface 236 of the wireless-enabled device 200 via the antenna subsystem 204. The received downstream messages 124 are routed to the control unit 232, which executes step 326A.

It should be appreciated that execution of the transmission function 314A need not be conditional upon receipt of the beacon 108A. In fact, the transmission function 314A can be independently synchronized with the wireless-enabled device 200 (specifically, with the control unit 232) and, if it so happens that there is responsive action-related information or unilateral action-related information to be transmitted, then this information will be sent during the next execution of the transmission function 314A.

Step 326A (FIG. 3A)

The control unit 232 receives the downstream messages 124 containing the responsive action-related information and the unilateral action-related information. In actuality, the downstream messages 124 are received by the communications transmit/receive interface 236 via the antenna subsystem 204. The communications transmit/receive interface 236 recognizes the nature of the downstream messages 124 and routes them to the control unit 232, where the responsive action-related information and the unilateral action-related information is extracted.

The control unit 232 then processes the responsive action-related information and the unilateral action-related information in order to effect a task based upon the information that was transmitted to it from the context server 112. Examples of tasks will be described herein below. Optionally, upon completion of the task, the control unit 232 may cause issuance of an upstream message 126 destined for the context server 122, for instance to signal such completion. Other uses for the upstream message 126 may be to indicate a request for additional information, a request to repeat a previous message, an acknowledgement/non-acknowledgement of success of an operation, and so on.

It should be appreciated that in certain instances, the control unit 232 may also receive downstream messages 124 containing data that is destined for the beacon control unit 238. For example, as will be described herein below, the context server 112 may wish to modify certain parameters of the beacon emission process, or certain parameters of other processes. This is accomplished by sending downstream messages 124 that are received by the control unit 232 and interpreted as being destined for the beacon control unit 238. Accordingly, the data comprises in these downstream messages 124 is extracted by the control unit 232 and forwarded to the beacon control unit 238 along the link 243.

Step 319 (FIG. 3B)

Referring now to FIG. 3B, it is recalled that the beacon control unit 238 reaches step 319 due to having determined at step 303 that the wireless-enabled device 200 is in a de-powered operational state. Thus, either (i) the on/off switch 244 has been turned off or (ii) the main power source 250 in the main power unit 212 holds insufficient charge, which could be due to depletion or removal of the main power source 250. In either case, power from the main power unit 212 to the first functional unit 206 and the network interface module 220 has been cut off, which means that the beacon control unit 238 is being powered by the alternate power source 260 in the alternate power unit 214. Naturally, the alternate power unit 214 could also be used to power the control unit 232 in the second functional unit 208, but rather than automatically instruct the power switch 218 to draw power for the second functional unit 208 from the alternate power unit 214, it may be more efficient from the perspective of managing the power budget of the alternate power source 260 to exercise more precise control over the time periods during which the second functional unit 208 will be powered from the alternate power unit 214. To this end, the beacon control unit 238 may subject the second functional unit 208 to a cycle of powering and no powering. In a specific non-limiting embodiment, the beacon control unit 208 can access a counter to determine whether it is passing through the beacon emission process loop for the $N^{th}$ time (where N may be a fixed value or may be programmable by the context server 112 or the control unit 232). If so, it proceeds to step 304C in FIG. 3C (see below) and the counter is reset. On the other hand, if the beacon control unit 238 is not passing through the beacon emission process loop for the $N^{th}$ time, the counter is incremented and the beacon control unit 238 proceeds to step 304B.

Step 304B (FIG. 3B)

The beacon control unit 238 causes the emission of a beacon from the antenna subsystem 204. Now, it will be noted that because the second functional unit 208 will not be powered, it is not attentive to downstream messages 124, and knowledge of this fact by the wireless communication system 150 and/or the context server 112 can avoid wasteful transmission of downstream messages 124. Accordingly, the beacon emitted via the antenna subsystem 204, denoted 108B, conveys ancillary data of Type B, which indicates an inattentiveness of the wireless-enabled device 200 to downstream messages 124 sent via the wireless communication system 150. The ancillary data conveyed by the beacon 108B can further include the charge level (and possibly also the rate of change of the charge level) of the main power source 250 in the main power unit 212, as determined from the power source monitoring output 248.

In addition, the beacon 108B emitted via the antenna subsystem 204 can optionally convey location data to allow the location server 104 to determine the location of the wireless-enabled device 200 within the area of interest. Non-limiting examples of location data include an identifier of the wireless-enabled device 200, a formatted version of a signal envelope for certain location systems (e.g., a UWB-based system) or other parameters used by a different location system (e.g., a WLAN-based system).

After emission of the beacon, denoted 108B, the beacon control unit 238 returns to step 302 in FIG. 3A. Meanwhile, continuing to assume that the wireless location system 160 is employed, the beacon 108B is received by the beacon receivers 102 in the wireless location system 160. The beacon 108B is processed by the core communications network 106. As a result, the location data relating to the beacon 108B is relayed to the location server 104 while the ancillary relating to the beacon 108B data is relayed to the context server 112. Thus, the present description continues with step 306B.

Step 306B (FIG. 3B)

The location data relating to the beacon 108B is received at the location server 104. The location server 104 determines the location of the wireless-enabled device 200 based on the location data relating to the beacon 108B, and generates location information 180 regarding the wireless-enabled device 200, which includes the location of the wireless-enabled device 200 within the area of interest, as well as the zone(s) associated with such location. The next step is step 312B.

Step 312B (FIG. 3B)

The context server 112 receives the location information 180 from the location server 104 and the ancillary data relating to the beacon 108B (including the inattentiveness of the wireless-enabled device 200 to downstream messages 124) from the core communication network 106. The context server 112 also receives the activity data conveyed by the upstream messages 126 received from the wireless-enabled device 200 in the meantime. The context server 112 considers this information together with the context information 114 (applying the various policies, etc.) and determines whether a "responsive action" is required. A responsive action is one which is triggered by the value of the ancillary data and/or the location information 180. Examples of responsive actions will be described in greater detail later on. Generally speaking, however, responsive actions are triggered by changes in charge level of the main power source 250, changes in the operational state of the wireless-enabled device and changes in the location of the wireless-enabled device. Some of the responsive actions may call for modification, enabling or disabling of functionality in the wireless-enabled device 200. In such cases, the context server 112 formulates "responsive action-related information" to be transmitted to the wireless-enabled device 200. The next step is step 314C in FIG. 3C.

Step 304C (FIG. 3C)

Referring now to FIG. 3C, it is recalled that the beacon control unit 238 reaches step 304C due to having determined at step 319 that the beacon control unit 238 is passing through the beacon emission process loop for the $N^{th}$ time. Meanwhile, the wireless-enabled device 200 continues to be in the de-powered operational state—which was also the case during the N−1 previous times that the beacon control unit 238 passed through the beacon emission process loop. Thus, the second functional unit 208 has been inattentive to downstream messages 124 from the context server 112 for the past N−1 passes through the beacon emission process loop.

Step 304C initiates a temporary change to this situation, by causing the emission of a beacon from the antenna subsystem 204, denoted 108C, conveying ancillary data of Type C, which indicates a current or future attentiveness of the wireless-enabled devices 200 to downstream messages 124 sent from the wireless communication system 150 that are destined for the wireless-enabled device 200. To this end, the ancillary data may define a "listening window" that may be considered to be in progress or may begin at some future time, but in either case alludes to at least some interval of time in the future.

In addition, the beacon 108C emitted via the antenna subsystem 204 can optionally convey location data to allow the location server 104 to determine the location of the wireless-enabled device 200 within the area of interest. Non-limiting examples of location data include an identifier of the wireless-enabled device 200, a formatted version of a signal envelope for certain location systems (e.g., a UWB-based system) or other parameters used by a different location system (e.g., a WLAN-based system).

After emission of the beacon 108C, the beacon control unit 238 proceeds to step 316. Meanwhile, continuing to assume that the wireless location system 160 is employed, the beacon 108C is received by the beacon receivers 102 in the wireless location system 160. The beacon 108C is processed by the core communications network 106. As a result, the location data relating to the beacon 108C is relayed to the location server 104 while the ancillary relating to the beacon 108C data is relayed to the context server 112. Thus, the present description continues with step 306C.

Step 306C (FIG. 3C)

The location data relating to the beacon 108C is received at the location server 104. The location server 104 determines the location of the wireless-enabled device 200 based on the location data relating to the beacon 108B, and generates location information 180 regarding the wireless-enabled device 200, which includes the location of the wireless-enabled device 200 within the area of interest, as well as the zone(s) associated with such location. The next step is step 312C.

Step 312C (FIG. 3C)

The context server 112 receives the location information 180 from the location server 104 and the ancillary data relating to the beacon 108C (including the indication of current or future attentiveness of the wireless-enabled device 200 to downstream messages 124) from the core communication network 106. The context server 112 also receives the activity data conveyed by the upstream messages 126 received from the wireless-enabled device 200 in the meantime. The context server 112 considers this information together with the context information 114 (applying the various policies, etc.) and determines whether a "responsive action" is required. A responsive action is one which is triggered by the value of the ancillary data and/or the location information 180. Examples of responsive actions will be described in greater detail later on. Generally speaking, however, responsive actions are triggered by changes in charge level of the main power source 250, changes in the operational state of the wireless-enabled device and changes in the location of the wireless-enabled device. Some of the responsive actions may call for modification, enabling or disabling of functionality in the wireless-enabled device 200. In such cases, the context server 112 formulates "responsive action-related information" to be transmitted to the wireless-enabled device 200. The next step is step 314C.

Step 314C (FIG. 3C)

Also based on the context information 114, the context server 112 may determine that certain "unilateral actions" are required. A unilateral action is one which does not depend on the ancillary data or the location information 180, but which may depend on the activity data. A unilateral action may also depend on other factors such as the current time. Examples of unilateral actions will be described in greater detail later on. Generally speaking, however, unilateral actions can be triggered by external events and/or application-level occurrences at the wireless-enabled device 200. Some of the unilateral actions may call for modification, enabling or disabling of functionality in the wireless-enabled device 200. In such cases, the context server 112 formulates "unilateral action-related information" to be transmitted to the wireless-enabled device 200.

The context server 112 causes execution of a transmission function that causes the responsive action-related information determined at step 312B and the responsive action-related information determined at step 312C and the unilateral action-related information, if any, to be sent to the wireless-enabled device 200 during the listening window defined in the ancillary data relating to the beacon 108C. Transmission of the responsive action-related information and the unilateral action-related information is effected in the form of downstream messages 124 sent during the listening window. In contrast to execution of the transmission function 314A, which was independently synchronized with control unit 232, here execution of the transmission function 314C is coordinated by the beacon control unit 238 so as to occur during the listening window.

It is noted that execution of the transmission function 314C will be triggered by receipt of a beacon conveying ancillary data of Type C but not by receipt of beacons conveying ancillary data of Type B, thus economizing the charge of the alternate power source 260 (which is used to power the beacon control unit 238 in the wireless-enabled device 200 during emission of beacons 108B, 108C and is also used to power the control unit 236 during the listening window as will now be described).

Step 316 (FIG. 3C)

Because it was assumed that the beacon 108C emitted at step 304C allowed the location server 104 to determine the beginning of the listening window, the beacon control unit 238 knows the start of this window. Accordingly, at step 316, the beacon control unit 238 waits for the start of the listening window, at which point (or slightly before which point) the beacon control unit 238 proceeds to step 318. A real-time clock may be employed by the beacon control unit 238 in order to wait for the appropriate amount of time.

Step 318 (FIG. 3C)

Recalling that the wireless-enabled device 200 is still in the de-powered operational state, one will appreciate that either (i) the on/off switch 244 has been turned off and/or (ii) the main power unit 212 holds insufficient charge. In either case, power from the main power unit 212 has been cut off. Thus, the second functional unit 208 (including the control unit 232) will have lost power, while the beacon control unit 238 will have become powered by the alternate power unit 214. To allow the second functional unit 208 to operate, the beacon control unit 238 utilizes the control signal 242 to cause the power switch 218 to draw power for the second functional unit 208 from the alternate power unit 214 containing the alternate power source 260.

Step 320 (FIG. 3C)

The beacon control unit 238 sends a trigger to the second functional unit 208 (more specifically, to the control unit 232) via the link 243 in order to indicate the beginning of the listening window.

Step 322 (FIG. 3C)

The trigger sent by the beacon control unit 238 is received by the control unit 232, which is now powered during the listening window by the alternate power unit 214.

Step 324 (FIG. 3C)

The control unit 232 begins listening for the previously mentioned downstream messages 124 containing the responsive action-related information and the unilateral action-related information from the context server 112.

Step 326C (FIG. 3C)

The control unit 232 receives the downstream messages 124 containing the responsive action-related information and the unilateral action-related information. In actuality, the downstream messages 124 are received by the communications transmit/receive interface 236 via the antenna subsystem 204. The communications transmit/receive interface 236 recognizes the nature of the downstream messages 124 and routes them to the control unit 232, where the responsive action-related information and the unilateral action-related information is extracted.

The control unit 232 then processes the responsive action-related information and the unilateral action-related information in order to effect a task based upon the information that was transmitted to it from the context server 112. Examples of tasks will be described herein below. Optionally, upon completion of the task, the control unit 232 may cause issuance of an upstream message 126 destined for the context server 122 to signal such completion.

It should be appreciated that in certain instances, the control unit 232 may receive downstream messages 124 containing an instruction to "wake up" the first processing unit 206. This can be done where the main power source 250 carries sufficient charge and, therefore, applies to the case where the wireless-enabled device is in a de-powered state only due to the on/off switch 244 having been turned off and not due to the main power source 250 having been depleted or removed. Accordingly, upon receipt of such an instruction, the control unit 232 utilizes the control signal 240 to override the on/off switch 244, effectively restoring power to the first functional unit 206 from the main power unit 212. Similarly, another one of the downstream messages 124 may contain an instruction to "shut down" the first processing unit 206, in response to which the control unit 232 utilizes the control signal 240 to cut off power from the main power unit 212 again, effectively returning control of the main power unit 212 to the on/off switch 244.

It should be appreciated that in certain instances, the control unit 232 may also receive downstream messages 124 containing data that is destined for the beacon control unit 238. For example, as will be described herein below, the context server 112 may wish to modify certain parameters of the beacon emission process, or certain parameters of other processes. This is accomplished by sending downstream messages 124 that are received by the control unit 232 and interpreted as being destined for the beacon control unit 238. Accordingly, the data comprises in these downstream messages 124 is extracted by the control unit 232 and forwarded to the beacon control unit 238 over the link 243.

Step 327 (FIG. 3C)

The beacon control unit 238 waits for the end of the listening window. The end of the listening window can be, for example, a pre-defined number of, e.g., microseconds, milliseconds, seconds or minutes after the beginning of the listening window. Alternatively, the end of the listening window may be specified in one or more of the downstream messages 124, either explicitly or as a request/instruction for a change vis-à-vis a predetermined "default" window length. The default window length can be short to cover situations where no messages (or short messages 124, 126) are to be exchanged, but is flexible to allow longer windows when longer messages 124, 126 are to be exchanged, thereby increasing the life-expectancy of the alternate power source 260. Alternatively, the end of the listening window may be deemed to have occurred if no new action-related information or other command is received for a pre-determined number of seconds or minutes. Alternatively, synchronized to the opening of a listening window, the context server 112 may provide a downstream message 124 destined for the beacon control unit 238, indicative of how long a window is required, thereby allowing a rapid shut down of the second functional unit 208 if no information is to be passed and ensuring enough time of operation within the second functional unit 208 should a long message need to be passed. This would optimize battery life of the alternate power source 260, which may be of a relatively small capacity. Other manners of signaling and controlling the end of the listening window can be used without departing from the spirit of the invention.

Step 328 (FIG. 3C)

At the end of the listening window, the beacon control unit 238 utilizes the control signal 242 to cause the power switch 218 to cease drawing power from the alternate power unit 214. This can be done by opening the power switch 218 entirely or by causing it to "draw" power from the main power unit 212 which, of course, is still cut off.

After execution of step 328, the beacon control unit 238 returns to step 302 for another pass through the beacon emission process loop. This may occur after a delay that is controllable. In particular, the time between emissions of consecutive beacons 108 (i.e., the beacon emission frequency) can be a controllable variable. Similarly, the value of N can also be modified, which has the effect of modifying the frequency with which the listening window is instantiated. Similarly, the counter described in step 319 could be set to a specific value in order to time-shift the next transmission instant (thereby to avoid interference with transmissions from other devices). These and other variables are examples of features of the signaling scheme employed by the wireless-enabled device 200 to transmit beacons 108A, 108B, 108C.

It should be appreciated that instructions for modifying the aforesaid features can constitute the aforesaid "responsive action-related information", which is received from the context server 112 via the downstream messages 124 sent as a result of the transmission function 314A (at independently synchronized times) and the transmission function 314C (during the listening window).

From the preceding description, it will also be appreciated that when the wireless-enabled device 200 is in a de-powered operational state, the second functional unit 208 is powered from the alternate power unit 214 for a period of time that approximately corresponds to the duration of the listening window. The fact that power is being used sparingly while the wireless-enabled device 200 is in a de-powered operational state results in economizing the charge of the alternate power source 260, allowing the longevity of the third functional unit 210 to be increased. This in turn allows an increased ability of the wireless-enabled device 200 to process greater amounts of responsive action-related information and unilateral action-related information over a greater period of time, even while power from the main power unit 212 is cut off.

As a result, embodiments of the present invention afford improved location tracking and inventory control, as well as enhanced modification, enabling and disabling capabilities for theft prevention and for other more routine purposes such as inventory tracking and control (including, specifically, equipment in a de-powered state), periodic equipment awakening for update or calibration purposes, and a possibility to dispense with regular replenishment of tag batteries, etc.

Persons skilled in the art will appreciate that in order to facilitate reception by the wireless-enabled device 200 of action-related information and unilateral action-related information sent by context server 112, it is within the scope of the invention to repetitively transmit this information (i.e., even outside the listening window), thereby to improve the chances of receipt by the wireless-enabled device 200 during the listening window.

The following provides a series of non-limiting examples of location-dependent context, non-limiting examples of possible responsive actions, and non-limiting examples of associated responsive action-related information, in which this first specific but non-limiting embodiment described above may be useful.

EXAMPLE RESPONSIVE-1

Suppose that the area of interest is a hospital, and the wireless-enabled device 200 is a tablet PC used by physicians. The wireless-enabled device 200 stores encrypted patient records on the hard drive 224 of the first functional unit 206. An encryption key used to encrypt/decrypt the patient records is stored in the non-volatile memory 234 of the second functional unit 208. The encryption key is used by the processor 222 in the first functional unit 206 each time that one of the patient records needs to be accessed, either for reading, writing or modifying.

Now suppose that the wireless-enabled device 200 enters the de-powered operational state, either by having been turned off by a physician or through depletion of the main power unit 212. Meanwhile, the wireless-enabled device 200 is being tracked by the location server 104. The context server 112 determines that the wireless-enabled device 200 has been de-powered, but also learns from the location server 104 and the context information 114 that the wireless-enabled device 200 is not in a pre-determined "device recharging zone" of the hospital. Under these circumstances, and based on policies currently in place, the responsive action to be taken could be to disable access to the patient records stored on the hard drive 224. Accordingly, the responsive action-related information could be a command to cause the non-volatile memory 234 of the second functional unit 208 to "forget" the encryption key. When this command is received by the control unit 232 in the second functional unit 208, it is processed and recognized, thus leading to temporary or permanent erasure of the encryption key in the non-volatile memory 234.

Thus, if the wireless-enabled device 200 had in fact been misappropriated, then once the operational state of the wireless-enabled device 200 becomes "active", the patient records will not be accessible. However, if the wireless-enabled device 200 is within the administration of hospital IT staff when its operational state becomes active, the encryption key can be re-sent via one of the downstream messages 124.

EXAMPLE RESPONSIVE-2

Suppose that the wireless-enabled device 200 is valuable piece of equipment on a site, and is in the possession of a person who is moving out of an approved zone or towards an exit of the site. Meanwhile, the wireless-enabled device 200 is being tracked by the location server 104. As recalled, this is possible regardless of whether the wireless-enabled device 200 is in the active state or the de-powered state. The location server 104 can also track the location of personnel within the site by virtue of their wearing a location transmitting badge. The context server 112 stores information on (i) the approved zone(s) for the wireless-enabled device 200 and (ii) which members of personnel are authorized to use the wireless-enabled device 200. In the event that the wireless-enabled device 200 moves out of an approved zone (such as towards an exit), its trajectory can be computed by the location server 104 and/or the context server 112, as can the trajectory of various personnel.

If it is determined by the context server 112 that the wireless-enabled device 200 is being moved by a certain member of personnel (due to the continuous proximity of this member to the wireless-enabled device 200) then the context server 112 examines the authorization of that member of personnel. Upon determining that that member of personnel is indeed entitled to move/remove the wireless-enabled device, the context server 112 logs the change and takes no further action.

However, in the event that the wireless-enabled device 200 is being moved by an unauthorized member of personnel, the context server 112 notes the movement and can take several responsive actions, depending on the policies in place. Example responsive actions could be to remotely "wake up" the wireless-enabled device 200 (via the sequence of events described earlier) and then to send a downstream message 124 to the wireless-enabled device 200 to (i) notify the member of personnel of his/her transgression or (ii) disable the wireless-enabled device 200 or (iii) cause display of a request to return of the wireless-enabled device 200 to the approved zone.

On the other hand, if the wireless-enabled device 200 is removed from an approved zone or is on a trajectory to be removed from the site by a person who cannot be tracked (due to the absence of a location transmitting badge), the context server 112 can deem the wireless-enabled device 200 as in the process of being stolen, in which case the context server 112 sends a downstream message 124 to the wireless-enabled device 200 to disable the wireless-enabled device 200 (see, for instance example RESPONSIVE-1), thus preventing data from being compromised. The context server 112 may also use downstream messages 124 to send other information such as a non-removable screen display that indicates "Property of XYZ Corp." or "Property of General Hospital", as well as loading data into the control unit 232 for use by the first functional unit 206 on awakening that will cause the communications interface 236 to "squawk" a homing message into any available WLAN network. In addition, the context server 112 can take other countermeasures such as triggering the capture of images at the appropriate doorway, alerting nearby security staff, or other actions.

Thus, the context server 112 can anticipate a possible theft in progress, rather than trying to detect the theft, upon completion, at an exit choke point—as would be the case with conventional RFID technology. In addition, this can be performed irrespective of whether the wireless-enabled device 200 is active or de-powered (unlike conventional WLAN location technology which stops working when the device in question is turned off) and without the problems associated with a stick-on tag. Furthermore, the functionality of the wireless-enabled device 200 can be modified or disabled, irrespective of its operational state, if warranted by the circumstances.

EXAMPLE RESPONSIVE-3

Suppose that the wireless-enabled device is a piece of medical equipment that is de-powered and placed into storage. Since the wireless-enabled device 200 has been placed into storage, it will not move and therefore its location will be static. This trajectory (which is a null trajectory) is detected by the context server 112, which can take a responsive action. For example, the context server 112 can send a signal to change a feature of the signaling scheme employed by the wireless-enabled device 200. For example, the context server 112 can instruct the wireless-enabled device 200 to send the beacon 108C (conveying ancillary data of type C) less frequently (i.e., by increasing the value of N) and/or to increase the duration of the beacon emission process loop, which would cause less drain on the alternate power source 260.

In the event that the wireless-enabled device 200 is moved, this is detected by the location server 104. In response, the context server 112 determines that the wireless-enabled device 200 is following a new (non-null) trajectory, and may take a responsive action. For example, the context server 112 can instruct the wireless-enabled device 200 to reduce the delay between instantiations of the beacon emission process loop, which would cause more accurate and lower-latency tracking of the wireless-enabled device 200 in the moments after it has been moved.

EXAMPLE RESPONSIVE-4

Based on the ancillary data derived from the beacons 108A, 108B, 108C, the context server 112 knows the charge level of the main power source 250 and the rate of change of the charge level. If the rate of change of the charge level is small and negative, and where the main power source 250 is a battery, this would imply that the wireless-enabled device 200 is drawing a normal amount of power from the battery. In some situations (such as where the wireless-enabled device 200 is an expensive communication device), the fact that the wireless-enabled device 200 is drawing a normal amount of power is considered acceptable only if there is authorized personnel in the vicinity of the wireless-enabled device 200. Therefore, the context server 112 can utilize the context information 114 to verify whether or not authorized personnel is in the vicinity of the wireless-enabled device 200 and, if not, the context server 112 may initiate communication with the wireless-enabled device 200 with a view to possibly disabling the wireless-enabled device 200 (which can be achieved by, for example, sending a downstream message 124 as described above).

EXAMPLE RESPONSIVE-5

Based on the ancillary data derived from the beacons 108A, 108B, 108C, the context server 112 knows the charge level of the main power source 250 and the rate of change of the charge level. If the rate of change of the charge level is small and negative, and where the main power source 250 is a battery, this would imply that either the wireless-enabled device 200 has suddenly drawn an excessive amount of power from the main power source 250 due to an excessive load or an equipment malfunction/short circuit. The fact that there is some small residual voltage indicates that the battery has not been removed. Hence, to suspect that a theft is underway would be premature. Nevertheless, the fact that the wireless-enabled device 200 has drawn an excessive amount of power may require further investigation and therefore the context server 112 may send a service request to the maintenance department.

EXAMPLE RESPONSIVE-6

Based on the ancillary data derived from the beacons 108A, 108B, 108C, the context server 112 knows the charge level of the main power source 250 and the rate of change of the charge level. The ancillary data may also specify the presence/absence of the main power source 250. If the rate of change of the charge level is large and negative, and if the charge level is zero or the main power source 250 is absent, then this would imply that the main power source 250 has been removed. (In the case where the main power source 250 is connected to a wall outlet, this would imply that the wireless-enabled device 200 has been disconnected from the wall outlet.) This may or may not lead to a conclusion that a theft is underway. For instance, the scenario where an authorized clinician or maintenance employee remains in the vicinity of the wireless-enabled device 200 while it loses power and is placed into a storage facility may be considered acceptable by the context server 112. In contrast, the absence of any authorized clinician in the vicinity of the wireless-enabled device 200 which loses power and begins moving at high speed towards an exit of a hospital may be considered unacceptable by the context server 112. Clearly, the context server can rely on a wealth of context information 114 to make these determinations, such as equipment profile, equipment association by proximity to clinicians, equipment moving without an associated member of staff, velocity and velocity vectors, etc. Thus, the context server 112 can in some circumstances conclude that the potential removal of the main power source 250 is a concern and can initiate a device-dependent and context-dependent (i.e., who was associated with the device, where was it, where is it now) time-out period during which reinstallation of the main power source 250 needs to occur (which can be inferred from the rate of change of charge level becoming positive); otherwise actions may be taken to signal a potential theft and/or disable certain functionality of the wireless-enabled device 200 (which can be achieved by, for example, sending a downstream message 124 as described above).

It should be noted that whether a negative rate of change of charge level is considered to be "small" or "large" is flexible, as it can depend on factors such as whether the on/off switch 244 is on or off. For example, if the on/off switch 244 is off, this would mean that the charge level should not change at all (other than due to battery leakage), and any appreciable rate of change that is negative can be deemed a "large" negative rate of change.

EXAMPLE RESPONSIVE-7

As part of a background process, the beacon control unit 238 can determine whether the on/off switch 244 has bounced. In other words, the voltage across, or the current through, the on/off switch 244 can be measured in order to determine whether the on/off switch 244 has been opened and then closed, or closed and then open. These measurements can be processed by the beacon control unit 238 to infer that an attempt has been made at activating the wireless-enabled device 200. The beacon control unit 238 then sends data that is indicative of an attempt to activate the wireless-enabled device 200. This can be done by generating ancillary data for transmission with the next beacon to be emitted (see above beacon emission process and, specifically, steps 304A, 304B and 304C in FIGS. 3A, 3B and 3C, respectively). Alternatively, the beacon control unit 238 can send the data indicative of an attempt to activate the wireless-enabled device 200 to the control unit 232 in the second functional unit 208 for transmission in an upstream message 126 destined for the context server 112. Upon receipt of the data indicative of an attempt to activate the wireless-enabled device 200, the context server 112 determines whether or not authorized personnel is in the vicinity of the wireless-enabled device 200 and, if not, the context server 112 may initiate communication with the wireless-enabled device 200 with a view to possibly disabling certain functionality of the wireless-enabled device 200 (which can be achieved by, for example, sending a downstream message 124 as described above).

The following provides a series of non-limiting examples of location-independent context, non-limiting examples of possible unilateral actions, and non-limiting examples of associated unilateral action-related information, in which this first specific but non-limiting embodiment may be useful. Those skilled in the art will appreciate that the following examples are also applicable in an embodiment without location capability, which would encompass the unilateral responsive actions.

EXAMPLE UNILATERAL-1

Suppose that the wireless-enabled device 200 is a mobile computing device. The processor 222 in the first functional unit 206 executes an anti-virus program that identifies and eradicates viruses from a known list of viruses in an anti-virus file stored on the hard drive 224 of the first functional unit 206.

Now suppose that the wireless-enabled device 200 is in a de-powered state and that the context server 112 learns of an important update to the anti-virus file after having determined that the wireless-enabled device 200 is in a de-powered state. Under such circumstances, and based on policies currently in place, the unilateral action to be taken can be to force an update of the anti-virus file stored on the hard drive 224. Accordingly, the unilateral action-related information is a command to update the anti-virus file with new anti-virus information. When this command is received by the control unit 232 in the second functional unit 208, it is processed and recognized. In response, the control unit 232 determines based on the power source monitoring output 248 whether the main power unit 212 holds sufficient charge (i.e., to confirm that the de-powered state of the wireless-enabled device 200 is not due to removal or depletion of the main power source 250). If indeed the main power unit 212 holds sufficient charge, the control unit 232 employs the control signal 240 to restore power from the main power unit 212. This activates the first functional unit 206 and results in storing the new anti-virus information on the hard drive 224 of the first functional unit 206. Subsequently, the control unit 232 deactivates the main power unit 212, again via the control signal 240. Alternatively, the updated anti-virus information can be stored in the non-volatile memory 234 to be transferred onto the hard drive 224 of the first functional unit 206 during its next externally activated power-up (e.g., resulting from someone pressing the on/off switch 244). As can be appreciated, once the operational state of the wireless-enabled device 200 becomes "active", the anti-virus information will be up-to-date.

EXAMPLE UNILATERAL-2

Suppose that the area of interest is a hospital and that certain ones of the wireless-enabled devices 100 are infusion pumps. An injured patient arrives in the emergency room of the hospital and an infusion pump is needed to help stabilize the patient. All infusion pumps in an active state are hooked up to other patients. The context server 112 needs to know where to find the nearest spare infusion pump that has been cleaned and is ready for use. Of note is the fact that spare infusion pumps will tend to be in a de-powered state.

A requester (such as a health care worker) queries the context server 112 via a (wireless or wired) terminal with a request for an infusion pump. The context server 112 notes the requestor's identity, validates his/her authorization to make the request and notes his/her location. The context server 112 queries the location server 104 for the locations of all of the de-powered infusion pumps and rank orders them (e.g., based upon distance from the requester). The context server 112 compiles a burst of data for transmission to the first-ranked infusion pump; such burst of data could be an instruction to wake up the first functional unit 206 of the infusion pump. Following receipt from the first-ranked infusion pump of an indication that that infusion pump (which is in a de-powered state) will be attentive to communication from the context server 112 during a future listening window, the context server 112 sends the burst of data during step 314C.

During the listening window, and assuming now that the first functional unit 206 has been woken up by causing power from the main power unit 212 to be restored (which assumes that the main power unit 212 is neither removed nor depleted), the context server 112 can communicate with the processor 222 in the first functional unit 206 in order to obtain a status of the infusion pump and its mechanism (e.g., whether it has been cleaned, the charge level of the main power unit 212, whether it is in a serviceable state). If the infusion pump returns an answer in the affirmative, then the context server 112 notifies the requester of the location of that infusion pump. If the infusion pump returns an answer in the negative, the context server 112 sends a note to the maintenance department, and proceeds to wake up the next rank-ordered infusion pump.

Thus, the requester is notified of the nearest infusion pump that is fully prepared for use, fully charged and not in use on a patient. Meanwhile, infusion pumps that are not ready for use can be flagged to the maintenance department. Such querying of equipment for status could also be done on a routine basis.

In other non-limiting embodiments, part of the processing effected by the context server 112 may be done by the wireless-enabled device. For example, the context server 112 may send data down to the wireless-enabled device 200 to allow the beacon control unit 238 to make local decisions as to control of the features of its signaling scheme. For example, control of the delay through the beacon emission process loop and control of the listening window frequency can achieve a balance between the need to provide accurate low-latency location and communications during an untoward event such as theft, while limiting the power drain on the alternate power source 260. Specifically, this balance can be achieved by temporarily increasing the rate of transmission of the beacons 108 and reducing the value of N for a period of a few minutes after the sudden drop in charge level and then progressively (e.g., exponentially or geometrically or step-wise) reducing the rate of transmission of the beacons 108 and increasing the value of N (either together or separately), in order to guard against accelerated depletion of the alternate power source 260 in the event that the wireless-enabled device 200 is placed into storage.

In another example, suppose that the area of interest is a hospital, and the wireless-enabled device 200 is a tablet PC used by physicians. The wireless-enabled device 200 stores encrypted patient records on the hard drive 224 of the first functional unit 206. An encryption key used to encrypt/decrypt the patient records is stored in the non-volatile memory 234 of the second functional unit 208. The encryption key is used by the processor 222 in the first functional unit 206 each time that one of the patient records needs to be accessed, either for reading, writing or modifying. A timer is set in the beacon control unit 238 that will erase this encryption key after a defined time from the last verified communication with the context server 112. Therefore, while communications are available with the context server 112, no erasure of the encryption key takes place. Now suppose that the wireless-enabled device 200 suddenly loses all communications (for example due to being slipped inside a metallic enclosure by a thief). After a defined time the encryption key will be erased, autonomously protecting any stored data. A further autonomous action could include after an extended period of time reducing the rate of beacon emissions. If the loss of communications with the wireless-enabled device 200 occurred by legitimate actions or due to temporary equipment failure, then once communications are restored to the wireless-enabled device 200 and it is within the administration of hospital IT staff when its operational state becomes active, the encryption key can be re-sent via one of the downstream messages 124.

While specific embodiments of the present invention have been described and illustrated, it will be apparent to those skilled in the art that numerous modifications and variations can be made without departing from the scope of the invention as defined in the appended claims.

The invention claimed is:

1. A system for communicating with a wireless-enabled device, comprising:
   an input for receiving from the device a signal indicative of the device being in a de-powered operational state, along with an indication of a charge level of a main power source of said device;
   a functional entity configured to determine, on a basis of (i) knowledge that the device is in the de-powered operational state and (ii) context information regarding the device, a first action to be taken by the device while in the de-powered operational state, and to determine a second action to be taken based on the indication of the charge level of the main power source of said device and based on a rate of change of said charge level; and
   an output for causing transmission of a message to the device, said message for causing the device to take said first and second actions while in the de-powered operational state.

2. The system defined in claim 1, wherein the output is configured to cause transmission of the message to occur during a pre-determined time interval.

3. The system defined in claim 1, wherein the functional entity is configured to receive location data from the device and determine a location of the device based on the location data.

4. The system defined in claim 3, wherein said context information regarding the device comprises information regarding the presence of authorized users in a vicinity of the device.

5. The system defined in claim 4, wherein said action comprises displaying a message on a screen of the device if said functional entity determines that there is no authorized user in the vicinity of the device.

6. The system defined in claim 4, wherein said action comprises at least partly disabling the device if said functional entity determines that there is no authorized user in the vicinity of the device.

7. The system defined in claim 4, wherein said action comprises erasing an encryption key required for use by the device if said functional entity determines that there is no authorized user in the vicinity of the device.

8. The system defined in claim 4, wherein said action comprises waking up dormant functionality of the device if said functional entity determines that there is at least one authorized user in the vicinity of the device.

9. The system defined in claim 1, wherein said action comprises updating an anti-virus file.

10. The system defined in claim 1, wherein said action comprises storing a configuration message for use at boot time.

11. The system defined in claim 3, wherein said context information regarding the device comprises information regarding a trajectory of the device.

12. The system defined in claim 11, wherein said action comprises at least partly disabling the device if the trajectory of the device is towards an exit of a facility to which usage of the device is restricted.

13. The system defined in claim 11, wherein said action comprises invoking a security feature if the trajectory of the device is towards an exit of a facility to which usage of the device is restricted.

14. The system defined in claim 13, wherein said security feature comprises image capture in a vicinity of the exit.

15. The system defined in claim 13, wherein said security feature comprises transmission of a message to security staff in a vicinity of the device.

16. A system for communicating with a wireless-enabled device, comprising:
   an input for receiving location data from the device, the location data being emitted by the device in accordance with a signaling scheme, and for receiving from said device an indication of a charge level of a main power source of said device;
   a location functional entity configured to determine a location of the device based on the location data;
   a context functional entity configured to determine, as a function of a trajectory of the device determined from at least two instances of the location of the device determined by the location functional entity, a modification to be made to the signaling scheme, and to determine an action to be taken based on the indication of the charge level of the main power source of said device and based on a rate of change of said charge level; and
   an output for sending a message to the device, said message for causing the device to effect said modification to the signaling scheme, and for causing the action to be taken.

17. The system defined in claim 16, wherein said modification to the signaling scheme comprises an increase in transmission frequency of the location data when the trajectory of the device shows an acceleration in movement of the device.

18. The system defined in claim 16, wherein said modification to the signaling scheme comprises a decrease in transmission frequency of the location data when the trajectory of the device shows a deceleration in movement of the device.

19. A system for communicating with a wireless-enabled device, comprising:
   an input for receiving from said device an indication of a charge level of a main power source of said device;
   a functional entity configured to determine an action to be taken based on the indication of the charge level of the main power source of said device and based on a rate of change of said charge level;
   the functional entity being configured to cause said action to be taken.

20. A method for communicating with a wireless-enabled device, comprising:
   receiving from the device a signal indicative of the device being in a de-powered operational state, and an indication of a charge level of a main power source of said device;
   determining, on a basis of (i) knowledge that the device is in the de-powered operational state and (ii) context information regarding the device, a first action to be taken by the device while in the de-powered operational state;
   determining, on a basis of the indication of the charge level of the main power source of said device and on a rate of change of the charge level, a second action to be taken; and
   causing transmission of a message to the device, said message for causing the device to take said first and second actions while in the de-powered operational state.

* * * * *